United States Patent [19]
Gillies et al.

[11] Patent Number: 5,101,273
[45] Date of Patent: Mar. 31, 1992

[54] DEVICE FOR THE CONVERSION OF MOTION INFORMATION INTO A MOTION INFORMATION SIGNAL AT THE FIELD RATE AND WITH THE NUMBER OF LINES DESIRED FOR HIGH-DEFINITION TELEVISION

[75] Inventors: David Gillies, Strasbourg, France; Mark Watson, Basingstoke, England

[73] Assignee: Laboratoire Europeen de Recherches Electroniques Advancees Societe en Nom Collectif, Courbevoie, France

[21] Appl. No.: 555,635

[22] Filed: Jul. 23, 1990

[30] Foreign Application Priority Data

Aug. 4, 1989 [FR] France ................... 89 10524

[51] Int. Cl.[5] .............................................. H04N 7/01
[52] U.S. Cl. ..................................... 358/140; 358/105
[58] Field of Search .............................. 358/105, 140

[56] References Cited

U.S. PATENT DOCUMENTS 4,661,850 4/1987 Strolle et al. ................. 358/140
4,701,793 10/1987 den Hollander ............. 358/140

FOREIGN PATENT DOCUMENTS 0241284 10/1987 European Pat. Off. .

Primary Examiner—Howard W. Britton
Attorney, Agent, or Firm—Oblon, Spivak, McClelland, Maier & Neustadt

[57] ABSTRACT

Disclosed is a device to convert a piece of motion information into a motion information signal at the field rate and with the number of lines desired for a high-definition television receiver. This device comprises:
  at least two memories for the storage, at the field rate of the input video signal, of respectively pieces of data pertaining to the information on motion of the even fields and pieces of data pertaining to the information on motion of the odd fields, these memories being read at the field rate of the video signal to be displayed, and
  a processing circuit connected to the output of the memories, said circuit delivering, from motion information read at the desired field rate, a motion information signal, at the field rate and with the number of lines desired, that is synchronous with the video signal to be displayed.

8 Claims, 10 Drawing Sheets

DEVICE FOR THE CONVERSION OF MOTION INFORMATION INTO A MOTION INFORMATION SIGNAL AT THE FIELD RATE AND WITH THE NUMBER OF LINES DESIRED FOR HIGH-DEFINITION TELEVISION

BACKGROUND OF THE INVENTION

1. Field of the Invention

The present invention concerns a device to convert the motion information contained in the video signals of a high-definition television receiver into a motion information signal at the field rate and with the number of lines desired. More particularly, it concerns a device that is used in association with the field rate conversion device for high-definition television receivers as described hereafter.

2. Description of the Prior Art

The field rate conversion device for high definition television receivers as discussed hereinafter enables enabling the conversion of the video signals received at input of a high-definition television receiver, notably decoded HD-MAC 1250/2:1/50 Hz signals or decoded PAL, SECAM or MAC 625/2:1/50 Hz input signals decoded into a high-definition display signal, namely a signal a display with a format of 1250 lines or 900 lines and 2:1 interlacing at a 100 Hz field rate. This field rate conversion device includes a static type input signals processing device and a dynamic (or motion) type input signals processing device. The switching between the dynamic type input signals processing device and the static type input signals processing device is activated by a motion information signal. Should the signals at input of the receiver be formed by HD-MAC 1250/2:1/50 Hz signals, these signals include, in addition to the video information, specific information such as a DATV (digitally assisted television) signal. This DATV signal contains information on the motion or non-motion of the pixels from one field to another. These items of information are therefore used as a motion information signal.

Thus, in the above device, when a field rate conversion of the video signals is done, two types of processing are needed depending on whether the input video signal is of the dynamic type or of the static type. Normally, for static type signals, the processing device carries out a low-pass vertical filtering based on a field while, for the dynamic or moving type signals, the corresponding processing device performs a low-pass vertical filtering based on an image. If a wrong processing is selected, it leads to major errors in the signal which are passed on to the displayed signal. Now, once it is decoded, the DATV signal used for the switching between the two devices gives a signal containing information on the synchronous motion of the 1250/2:1/50 Hz video signal. This signal indicates whether a particular signal should be processed as being static or in motion. However, if it is to be possible for this DATV signal to be used as a motion information signal achieving the switching between the static type processing device and the dynamic type processing device in the field rate conversion device, this signal must be processed so that the motion information is converted into a motion information signal at the field rate and with the number of lines desired.

SUMMARY OF THE INVENTION

The present invention is therefore aimed a proposing a device that enables the conversion of the motion information contained in the video signals of a high-definition television receiver into a motion information signal at the field rate and with the number of lines desired.

The present invention is also aimed at proposing a device such as the one described above, which may be used for a 1250/2/1/100 Hz type or 900/2:1/100 Hz type display, or a display having different characteristics as regards the number of lines.

Consequently, an object of the present invention is a device to convert the motion information contained in the video signals of a high-definition television receiver into a motion information signal at the field rate and with the number of lines desired, said device comprising:

at least two memories for the storage, at the field rate of the input video signal, of respectively pieces of data pertaining to the information on motion of the even fields and pieces of data pertaining to the information on motion of the odd fields, these memories being read at the field rate of the video signal to be displayed, and a processing circuit connected to the output of the memories, said circuit delivering, from motion information read at the desired field rate, a motion information signal, at the field rate and with the number of lines desired, that is synchronous with the video signal to be displayed.

In general, the pieces of data relating to the motion information consist of one binary position or bit for one pixel. In this case, the capacity of the memories should be $576 \times 1440 \times 1$ bits. However, most usually, the pieces of data relating to the motion information concern a block of several pixels on several consecutive lines. In general, each block has a size of 16 pixels $\times$ 16 lines per field. In this case, the pieces of data relating to the motion information consist of at least one bit for one block of pixels.

According to another characteristic of the present invention, the pieces of data relating to the motion information are constituted by several bits forming an encoding. For example, this encoding may give information on the speed of the motion information.

According to a preferred embodiment, the processing circuit is formed by two identical vertical filters, respectively connected to the output of the even field and odd field memories, an adder receiving the output of the two filters and a comparator comparing the output of the adder with a threshold value so as to give out a motion or non-motion information signal at the field rate and with the number of lines desired.

In the case of the above-described circuit, only a motion or a non-motion is detected. However, the comparator giving a two-level switching can be replaced by a gradual comparator giving more detailed indications on the speed of the motion. According to an embodiment used in this case the processing circuit is formed by two identical vertical filters, respectively connected to the output of the even field and odd field memories, an adder receiving the output of the two filters and a means generating a coefficient from the output of the adder, said coefficient being a function of the motion information.

Furthermore, each vertical filter is formed by n delay cells giving a delay of one memory-line, n+1 multipliers each receiving, at one input, a specific multiplier coefficient as a function of the number of lines to be displayed and receiving, at the other input, either the input of the first cell or the output of the n cells, a first adder adding the output of the first two multipliers, and n adders adding the output of the preceding adder and that of the order n+1 multiplier.

The above filter can be used for a 1250-line as well as a 900-line display. If the signals have to be displayed solely on 1250 lines, the processing circuit may be formed solely by delay cells giving a delay of one memory line so as to synchronize the motion information with the video signals.

BRIEF DESCRIPTION OF THE DRAWINGS

Other characteristics and advantages of the invention shall appear from the following description of various embodiments, made with reference to the appended drawings, of which.

To simplify the description, the same references are repeated for the same elements in the different figures.

DETAILED DESCRIPTION OF THE INVENTION

Figure 1:
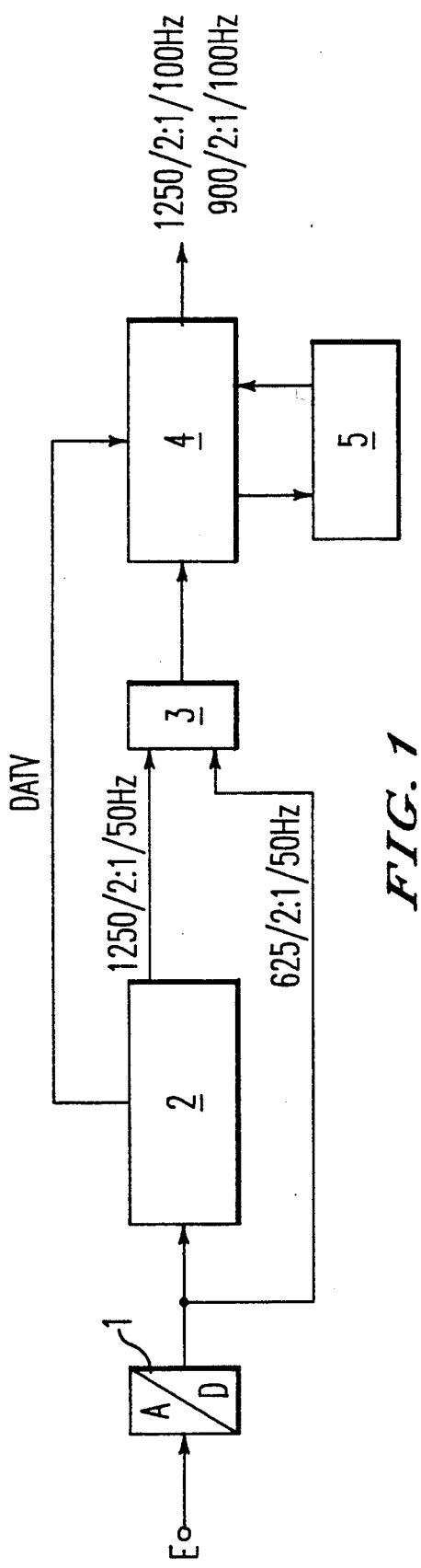
FIG. 1 is a simplified block diagram of a high-definition television receiver including a field rate conversion device as described in more detail hereinafter.

FIG. 1 gives a succinct view of the basic structure of a high-definition television receiver. This television receiver essentially includes an analog-digital converter 1 receiving, at input, video signals E such as HD-MAC 1250/2:1/50 Hz signals or PAL, SECAM or MAC 625/2:1/50 Hz signals. The 625/2:1/50 Hz type signals at the output of the converter 1 are sent directly to a switching device 3 while the 1250/2:1/50 Hz signals are sent to the device 3 through a decoder 2 with a known type of bandwidth reduction. The device 3 sends either 1250/2:1/50 Hz signals or 625/2:1/50 Hz signals towards a rate conversion device 4 as described hereinafter. The rate conversion device 4 receives a piece of DATV information. This DATV signal coming from the decoder 2 comprises motion information and must be converted into a signal compatible with a 1250/2:1/100 Hz or 900/2:1/100 Hz display so that it can be used in the device 4. Furthermore, the television receiver of FIG. 1 has a motion information device 5 connected to the rate conversion device 4 enabling a detection of motion to be achieved in a decoded PAL, SECAM, MAC television image which has no DATV signal. The output signal S is used for the display on the screen. It is a 1250/2:1/100 Hz or 900/2:1/ 100Hz type high definition signal.

Figure 2:
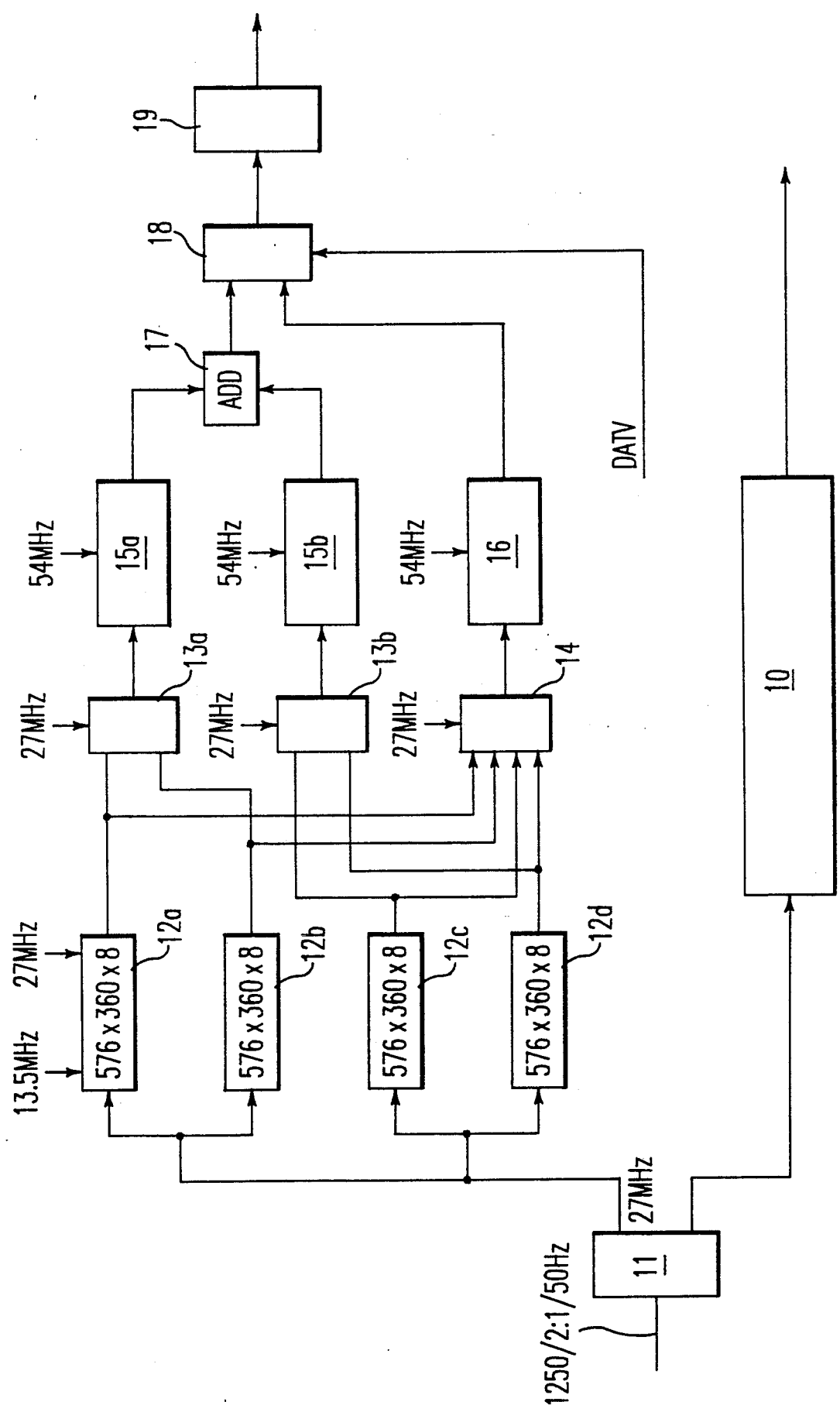
FIG. 2 is a simplified block diagram of a frequency conversion device used for type 1250/2:1/50 Hz luminance signals.
Figure 3:
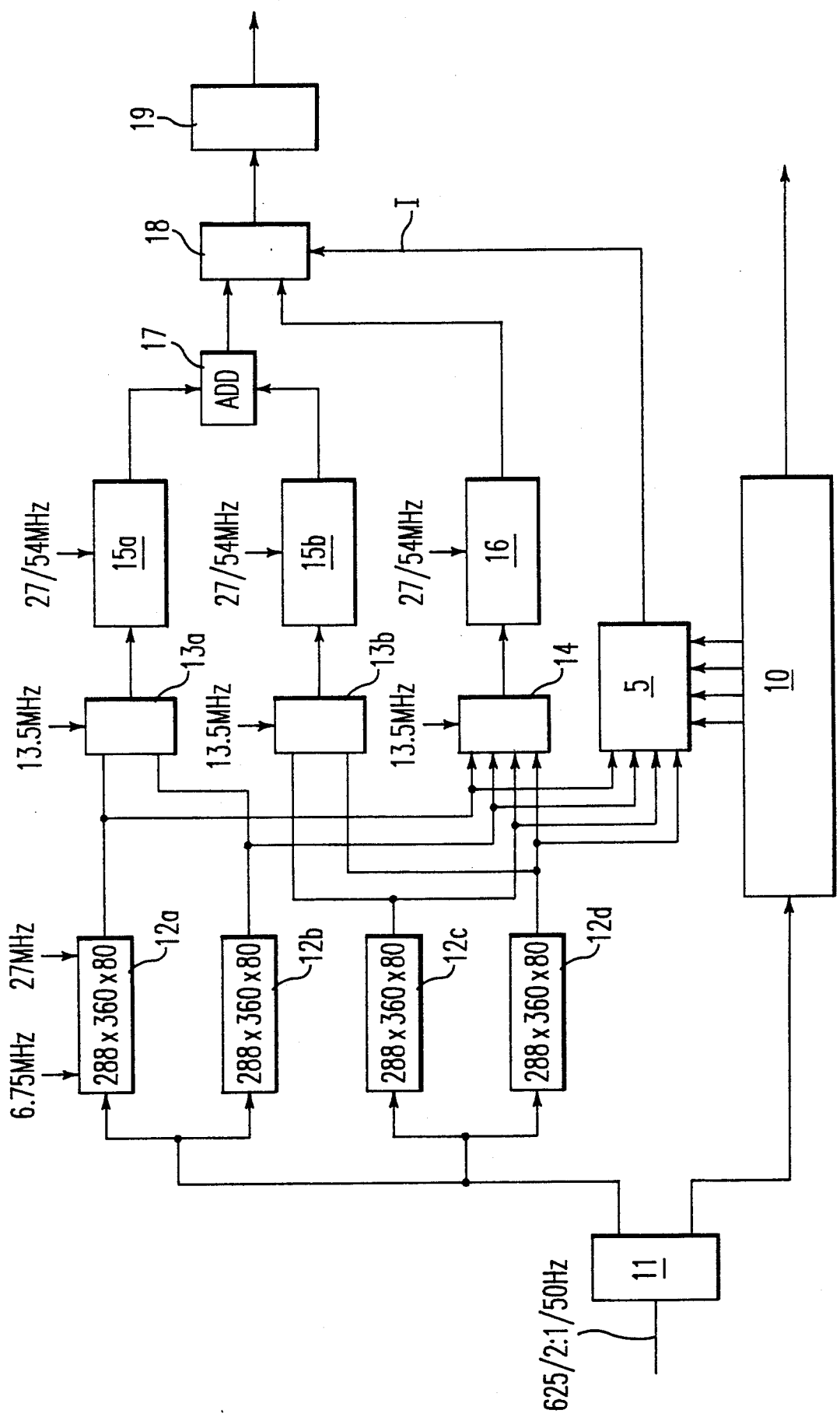
FIG. 3 is a block diagram of a frequency conversion device used in the case of type 625/2:1/50 Hz luminance signals.

Referring to FIGS. 2 and 3, we shall now give a schematic description of a frequency conversion device, by which it is possible to obtain a 100 Hz frame frequency signal from a 50 Hz frame frequency input signal. It shall be recalled first of all that the frequency conversion device 4 shown in FIG. 1 is actually formed by several frequency conversion devices with the same basic structure but with certain characteristics having been modified to match the type of signal received at input. Consequently, FIGS. 2 and 3 simply represent the frequency conversion device used either with a 1250/2:1/50 Hz Hd-MAC type of luminance signal for FIG. 2 or with a 625/2:1/50 Hz PAL, SECAM or MAC type of luminance signal for FIG. 3. The same type of frequency conversion device is used for the chrominance channels of the 1250/2:1/50 Hz and 625/2:1/50 Hz signals. In this case, the modulation frequencies are different. For, the sampling frequencies of the 1250/2:1/50 Hz HD-MAC signals are 54 MHz for the luminance and 27 MHz for the chrominance, and the sampling frequencies of the 625/2:1/50 Hz PAL, SECAM or MAC signals correspond to the standards given by the CCIR report No. 601 and are 13.5 MHz for the luminance and 6.75 MHz for the chrominance.

Furthermore, to limit the working frequency of the different devices used in the frequency conversion device, the processing has been divided into two, the even-order and odd-order pixels being sent in parallel between a demultiplexer and a multiplexer. In FIGS. 2 and 3, the block 10 symbolically represents the conversion device used for the processing of the even-order pixels.

We shall now give a detailed description of that part of the frequency conversion device used for the processing of the odd-order pixels. As shown in FIG. 2, the signal corresponding to the odd-order pixels come from a demultiplexer 11 and are sent to four frame memories 12a, 12b, 12c, 12d. The frame memories 12a and 12b enable the storage of the odd-order frames, while the frame memories 12c and 12d enable the storage of the even-order frames. In the case of FIG. 2 which processes the 1250/2:1/50 Hz HD-MAC signals, each frame memory 12 has a capacity of 576 ×360 ×8 (576 corresponding to the useful lines, 360 to the number of useful odd-order pixels per line and 8 to the number of encoding bits of each pixel). These memories are arranged in such a way that the alternating samples are written in the alternating memories at a sampling frequency 13.5 MHz, namely at a sampling frequency which is half of the frequency of the input data which is 27 MHz. The output of the frame memories 12a and 12b is sent through a multiplexer 13a multiplexing the two memories at a sampling frequency of 27 MHz towards a vertical filter 15a processing the data at a sampling frequency of 54 MHz. The vertical filter shall be described in detail here below. In the same way, the outputs of the frame memories 12c and 12d are sent towards a multiplexer 13b which is identical to the multiplexer 13a, the output of which is connected to a vertical filter 15b identical to the filter 15a. The outputs of the two filters 15a and 15b are sent to an adder 17, the output of which is connected to the input of a changeover switch 18. Furthermore, outputs of the frame memories 12a, 12b, 12c and 12d are also sent to a multiplexer 14 that multiplexes these outputs at a sampling frequency 27 MHz. The multiplexer 14 successively selects the output of the frame memories 12a, 12c, 12b, 12d, each for a duration of 20 ms. This sequence is repeated every 80 ms, or with a frequency of 12.5 Hz. The output of the multiplexer is connected to a dynamic vertical filter 16 giving data at 54 MHz. The output of the vertical filter 16 is sent towards the change-over switch to the multiplexer 18 which switches over either towards the adder 17 or towards the filter 16 as a function of a DATV piece of information on motion. As shown in FIG. 2, the output of the device 18 is sent to an output buffer register 19 which gives, at output, the display signal which may be a signal of the 1250/2:1/100 Hz type or a signal of the 900/2:1/100 Hz type.

As shown in FIG. 3, in the case of 625/2:1/50 Hz type input signals, the frame memories 12a, 12b, 12c and 12d have a capacity of 288 ×360 ×8 (288 corresponding to the useful lines, 360 to the number of odd-order pixels used per line and eight to the encoding of each pixel). The frequency of writing in memory is 6.75 MHz for luminance signals while the reading frequency is 27 MHz. The input sampling frequency is multiplied by four for the following reasons: the conversion of the frame frequency from 50 Hz into 100 Hz increases the sampling frequency by two. Furthermore, each input line is repeated twice at the output of the frame memory in such a way that, with 625 lines at input, 1250 lines are obtained at output. This again increases the sampling frequency by a factor of 2. This is necessary for the working of the vertical filters below. In the same way, the multiplexers 13a, 13b and 14 have a multiplexing frequency of 12.5 MHz, and the filters 15a, 15b and 16 work at frequencies of 27 MHz. There is an adder 17 receiving the outputs of the filters 15a and 15b, with a change-over switch 19 flipping over as a function of a piece of information I coming from a motion detector 5 which shall be described in greater detail here below. In this case, four frame memories are used in order to be capable of performing the motion detection. Each odd-order frame memory 12a and 12b or even-order frame memory 12c and 12d stores an input frame. This means that four successive frames are stored in the memories 12a, 12b, 12c, 12d while, in the device of FIG. 2, the two odd-order frame memories 12a and 12b or even-order frame memories 12c and 12b store an even-order input frame or an odd-order input frame.

Figure 4:
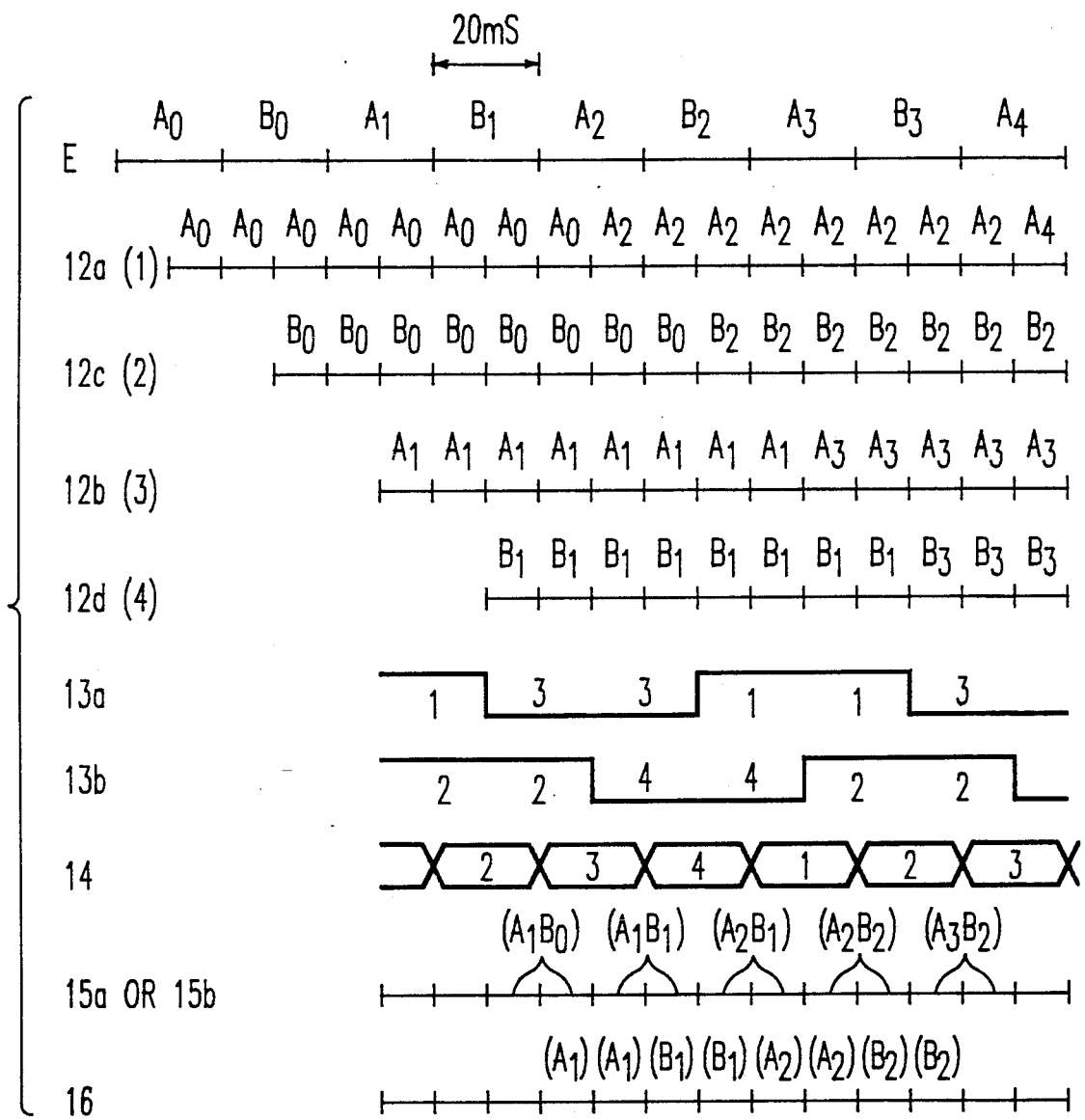
FIG. 4 is a timing diagram explaining the working of the device of FIG. 3.

We shall now explain the working of the device of FIG. 3 with more particular reference to the timing diagram of FIG. 4. The signal E corresponds to the input signal at 50 Hz and represents successive frames A0, B0, A1, B1, A2, B2, A3, B3, etc., the duration of which is 20 milliseconds. In this case, the odd-order frames A0, A1, A2, A3, A4 are stored in the frame memories 12a and 12b in such a way that the frames A0, A2, A4 are stored in the memory of 12a and the frames A1, A3 etc. are stored in the memory 12b. Similarly, the even-order frames B0, B1, B2, B3 are stored alternately in the memories 12c, 12b in such a way that the frames B0, B2, etc. are stored in the memory 12c and the frames B1, B3, etc. are stored in the memory 12d. The outputs of the memories 12a and 12b, and of the memories 12c and 12d are respectively multiplexed by the multiplexers 13a, 13b so as to obtain, during two frames or 40 milliseconds, the output of one of the memories with a shift of one frame between the two multiplexers 13a and 13b. At the output of the multiplexer 14, we successively obtain the outputs of the memories 1, 2, 3, 4 for a duration of one input frame, namely 20 milliseconds. Thus, at output of the static vertical filter 15a and 15b, we obtain a frequency which is twice the starting frequency, respectively the frames A1, A1, A1, A1, A2 ... and the frames B0, B0, B1, B1, B1, B1, B2, ..., these frames being each maintained four times. In the same way, at output of the dynamic filter 16, we successively obtain the frames A1, A1, B1, B1, A2, A2, B2, B2 at a frequency which is twice the starting frequency, these frames being maintained twice as shown in FIG. 4.

Figure 5:
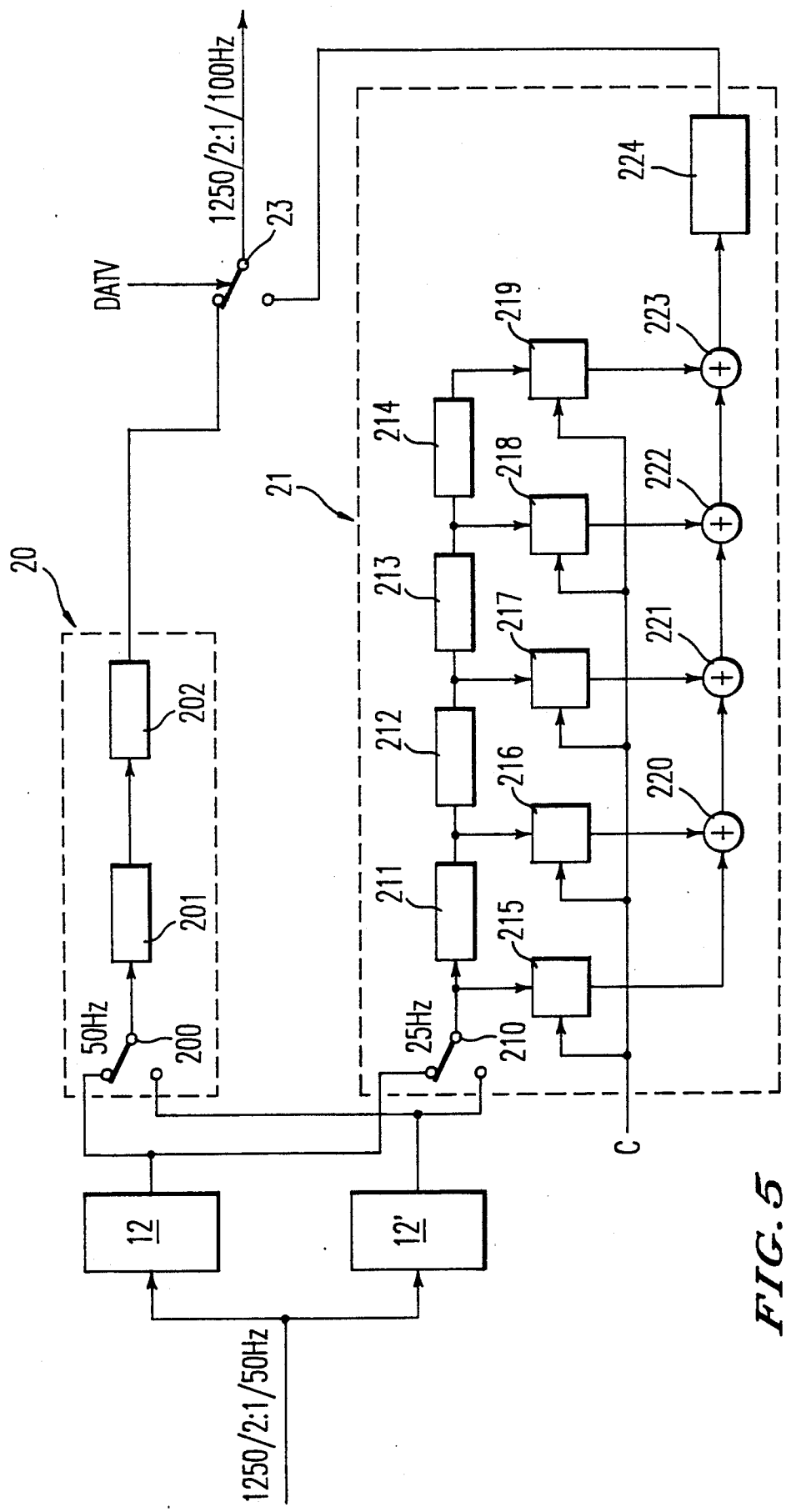
FIG. 5 is a block diagram of the processing devices used in the frequency conversion device in the case of a conversion of 1250/2:1/50 Hz into 1250/2:1/100 Hz.

Referring to FIG. 5, we shall now describe an embodiment of the static type processing device 20 and dynamic type processing devises 21 used in the case of a 1250/2:1/50 Hz signal converted into a 1250/2:1/100 Hz signal. In this case, it is seen that the static type processing device is actually formed by a single multiplexer 200 at 50 Hz, alternately connecting the odd-order frame memory 12 and the even-order frame memory 12' which actually consist of the two memories 12a, 12b and 12c, 12d in FIG. 2, and two series-connected one-line delay cells 201 and 202. In fact, these cells 201 and 202 are used to equalize the transit time of the data between the static type processing device 20 and the dynamic type processing device 21. The dynamic type processing device 21 is, for its part, formed by a vertical filter connected by a multiplexer 210 multiplexing the outputs of the frame memories 12 and 12' at 25 Hz. The output of the multiplexer 210 is sent to four identical one-line delay cells 211, 212, 213, 214 that are series-mounted and each capable of storing a frame memory line. Furthermore, the vertical filter has five multipliers 215, 216, 217, 218, 219 which receive, at one of their inputs, a multiplier coefficient C which is a function of the type of input signal processed, namely 1250 lines in the present case. At their other input, the multipliers 215, 216, 217, 218, 219 respectively receive the output of the multiplexer 210 for the multiplier 215, the output of the cell 211 for the multiplier 216, the output of the cell 212 for the multiplier 217, the output of the cell 213 for the multiplier 218 and the output of the cell 214 for the multiplier 219. Similarly, the outputs of the multipliers 215 to 219 are respectively sent to adders 220, 221, 222, 223. The adder 220 receives the outputs of the multipliers 215 and 216. The other adders 221, 222, 223 respectively receive the output of a multiplier 217, 218, 219 and the output of the previous adder 220, 221 and 222. The output of the adder 223 is itself sent to a cut-off device 224. In the above-described vertical filter, the multipliers may be replaced by simple addition and shift cells. The static type processing devices 20 and dynamic type processing devices 21 are each connected to an input of a change-over switch 23, the switching over of which is controlled by the DATV signal as a function of a detection of a piece of information on motion. Thus, at the output of the device 23, a signal to be displayed of the 1250/2:1/100 Hz type is obtained.

Thus, in the case of FIG. 5 corresponding to a conversion of 1250/2:1/50 Hz into 1250/2:1/100 Hz, in the case of static inputs, each complete input image may be used directly to generate two interlaced frames at the display level while, in the case of the dynamic type inputs, each interlaced frame is generated from an input frame.

Figure 6:
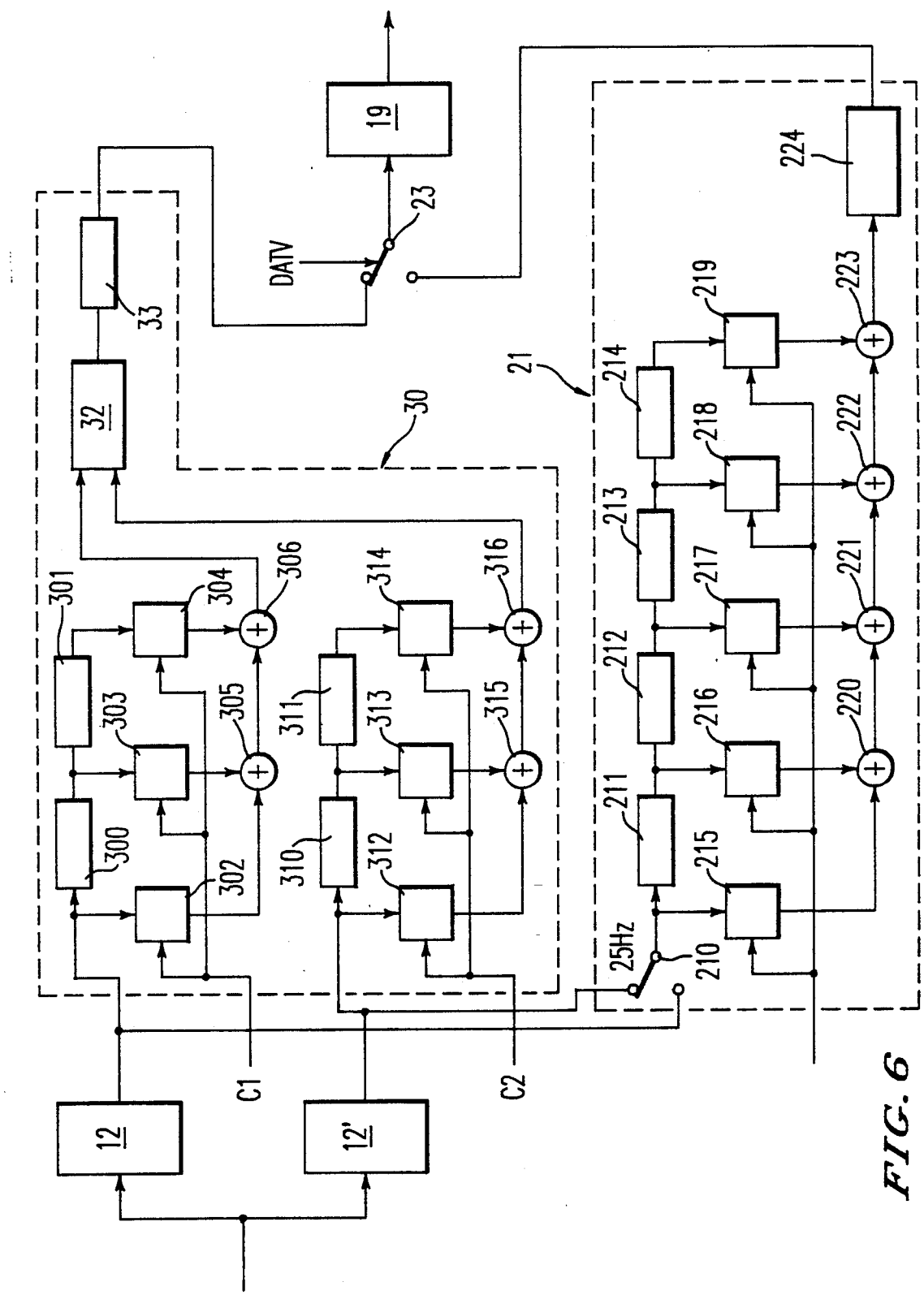
FIG. 6 is a block diagram of the processing devices used in a frequency conversion device according to another embodiment.

Referring to FIG. 6, we shall now describe another embodiment of a static type processing device 30 used more particularly in the case of a conversion of 625 lines into 1250 or 900 lines or in the case of a conversion of 1250 lines into 900 lines. In this case, two identical filtering circuits are used, one for the even-order frames and the other for the odd-order frames, as shown in FIG. 6. Each vertical filtering circuit is formed by two one-line delay cells 300, 301 or 310, 311, three multipliers or addition and shift cells 302, 303, 304 or 312, 313, 314, and two adders 305, 306 or 315, 316. At one of their inputs, the multipliers receive a multiplier coefficient C1 or C2 which is a function of the processed signal. In fact, the multiplier coefficients C, C1, C2 are identical for one type of input signal. The value of the coefficient is a function of the input and output signals, as well as of the output sampling. These coefficients may be obtained from a single decoder which generates the correct coefficient. At their other input, the multiplier receive either, directly, the output of the corresponding frame memory 12 or 12' or the output of the one-line delay cells 300, 301 or 310, 311. The outputs of the multipliers 302, 303, 304 or 312, 313, 314 are sent to the adders 305, 306, or 315, 316 in such a way that the adder 305 or 315 receives the outputs of the multipliers 302 and 302 or 312 and 313 and in such a way the adder 306 or 316 receives the output of the adder 305 or 315 and the output of the multiplier 304 or 314. It is perceived that the vertical filters have the same basic structure as the vertical filter used in the case of the dynamic type of processing device 21 which, in this figure, is identical to the one described with reference to FIG. 5. The outputs of the two vertical filters, even-order and odd-order filters, are sent to an adder 32 which also performs a signal cut-off operation, if necessary. The output of the adder 32 is sent to a one-line delay cell 33 to equalize the transit time within the static type processing device 30 and the dynamic type processing device 21. As in the case of the device of FIG. 5, the outputs of the two processing devices are sent to a change-over switch 23 which switches over to either of the devices as a function of a DATV motion signal or of the signal coming from the motion detection device which shall be described in greater detail hereinafter. If necessary, an output buffer register 19 is provided at output of the device 23. The separation of the vertical filters into an even-order vertical filter and an odd-order vertical filter in the device of FIG. 6 makes it possible to simplify the structure of the filter and to preserve certain line storages. The buffer register 19 is a FIFO (First In First Out) type of buffer register and is designed to format the period of the active lines of the filtered signal for the display as a function of the number of lines to be displayed. In the case of a conversion of 625/2:1/50 Hz into 900/21/100 Hz or 1250/2:1/100 Hz, it is necessary to have an output buffer register of one line. In the case of a conversion of 1250/2:1/50 Hz into 900/2:1/100 Hz, the output buffer register is a 23-line register. This capacity is necessary because of the relationship between the active lines and the extinguishing for a 900-line standard.

A brief explanation shall now be given of the working of the vertical filters used in the processing devices of FIGS. 5 and 6. Filters such as this are necessary because the vertical sampling frequency of the displayed image may be different from that of the input image. If we consider the conversion of a 1250/2:1/50 Hz signal into a 900/2:1/100 Hz display signal, in the case of a static image, the image is formed by 1152 active video lines. These lines may be considered to sample the image in the vertical direction, giving a vertical sampling frequency of 1152c/ph (cycles per image height). Theoretically, the maximum vertical frequency without modification of the spectrum of the signal corresponds to half of this value, namely 576 c/ph. If this image is displayed as a 900-line image, containing 864 active lines (vertical sampling frequency 864 c/ph), any information on a signal with a frequency greater than 432 c/ph will give rise to errors in the display image. The static vertical filter therefore does a low pass filtering of the input signal in such a way that there is no information above 432 c/ph.

For moving images of the same standard, the vertical sampling frequency is equal to the number of active lines per frame or 576 cp/h with a maximum resolution of 288 c/ph. For the display, the vertical sampling frequency is also reduced by a factor of half to 216 c/ph. As a consequence, the dynamic vertical filter does a low-pass filtering so that there is no information above 216 c/ph.

These different sampling frequencies for the static and dynamic images call for the use of two separate filters. The cut-off frequencies of the low-pass filters depends on the input and output standards and the frequency responses may be modified by modifying the value of the coefficients C, C1, C2.

Figure 7:
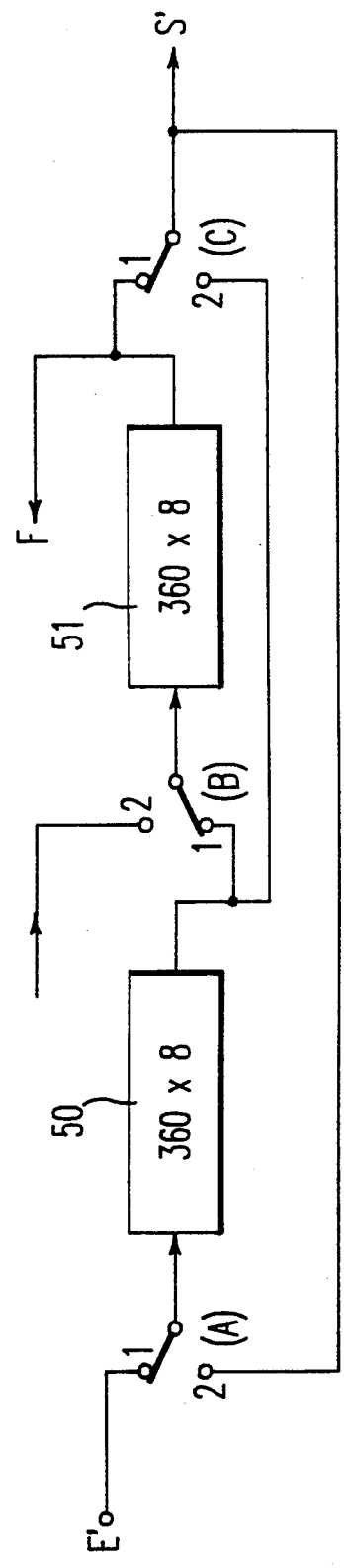
FIG. 7 is a block diagram of a one-line delay cell used in the processing devices of FIGS. 5 and 6.

As shown in FIG. 7, the one-line delay cells such as those used in FIGS. 5 and 6, referenced for example 210, 210, 211, 212, 213, 214, 300, 301, 311, 33 are made as follows: they have two line memories 50, 51, each having a capacity of 360 ×[ which corresponds to the capacity of one line of the frame memories used. These two memories 50, 51 are connected by using two change-over switches A, B, C in the following way: the following way: the input signal is sent to the terminal 1 of the change-over switch A, the output of which is connected to the input of the cell 50. The output of the cell 50 is connected either to the terminal 1 of the change-over switch B or to the terminal 2 of the change-over switch C. The output of the change-over cell B is sent to the cell 51 and the output of the cell 51 is sent to the input 1 of the change-over switch C, or is directed towards the motion detection circuit as indicated by the arrow F. Moreover, the input 2 of the change-over switch B receives the motion detection signal, either the DATV signal or the signal coming from the motion detection device. The output of the change-over switch is looped to the input 2 of the switch A or gives the output signal S'. Thus, when the change-over switch A is in the position 1, the cell 50 receives an input or piece of data coming from an external source. When the change-over switch A is in the position 2, it receives a piece of data, stored beforehand in the line storage device. When the change-over switches B and C are respectively in the position 1, the cell stores 720 samples and works for the 1250 line mode. When B and C are simultaneously in the position 2, the cell stores 360 samples and works for the 625 line mode. Similarly, when B and C are in the position 2, the cell 50 stores samples used for the video signal in the case of a vertical filter while the cell 51 is used to store a piece of data on the detection of motion.

Figure 8:
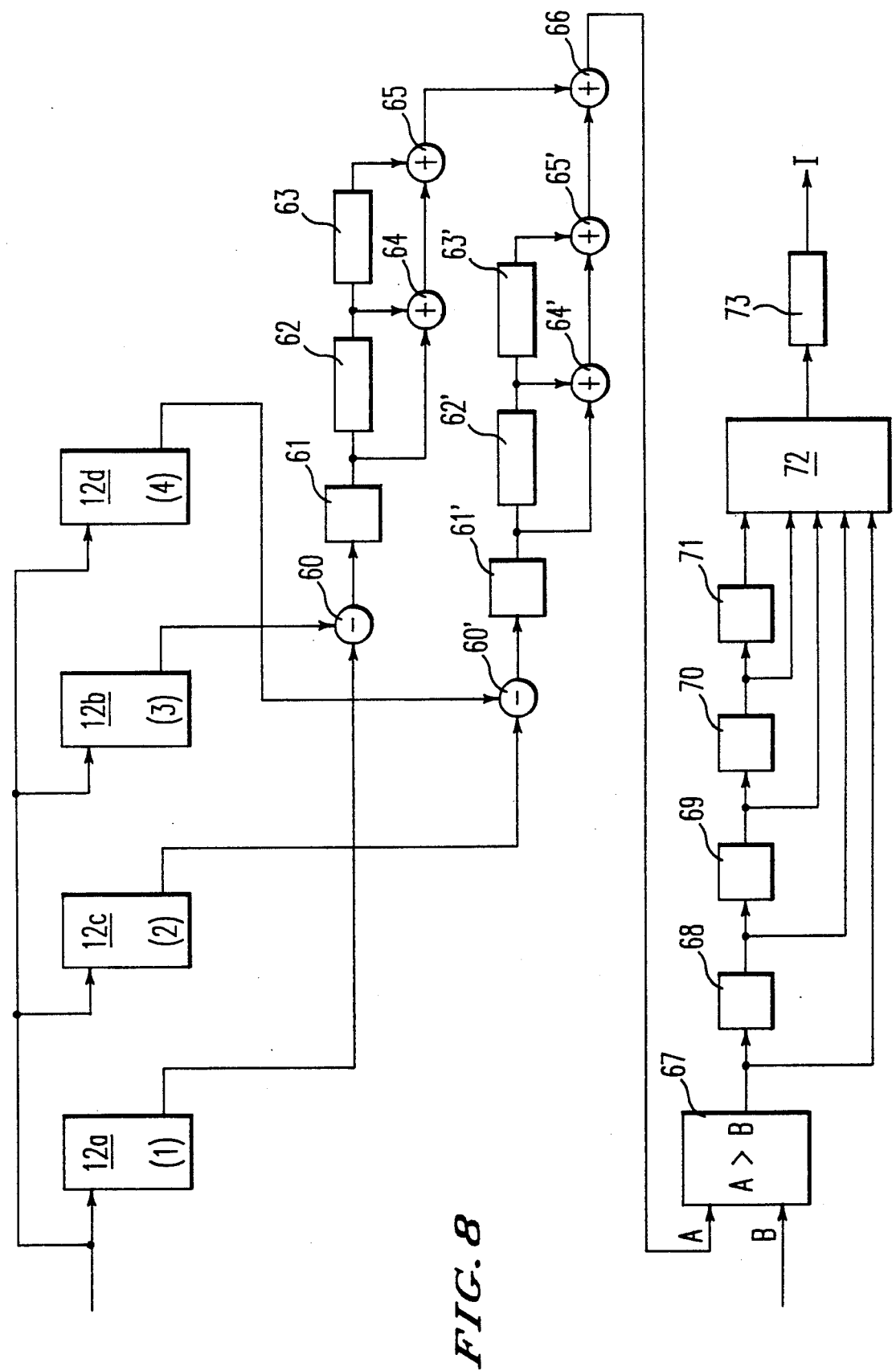
FIG. 8 is a block diagram of a device for the detection of the motion in an encoded television image used with the frequency conversion device of FIG. 3.

Referring to FIG. 8, we shall now describe a motion detection device enabling the detection of a motion between two images. To detect the motion, we use pieces of information stored in the frame memories 12a, 12b, 12c, 12d. A first image is stored in the odd-order frame memory 12a and the even-order frame memory 12c, and a second image is stored subsequently in the odd-order 12b and the even-order memory 12d. The storage is done in the manner described with reference to FIG. 3. The outputs of the odd-order frame memories 12a and 12b are sent to a subtractor 60 subtracting the encoding of a pixel contained in 12b from the encoding of the pixel of the same position contained in 12a. In the same way, the outputs of the even-order frame memories 12d, 12c are sent to a subtractor 60' which works identically to the subtractor 60. The outputs of the subtractors 60 and 601 are sent, respectively, to a device taking the absolute value 61, 61'. The output of the devices 61 and 611 are sent to one-line delay cells 62, 63 and 62', 63'(this delay is obtained by the part 51 described in detail in FIG. 7, when the change-over switches B and C are in position 2). The cells make it possible to add up the successive samples by means of the adders 64, 65 and 64', 65'. The adders 64, 65 and 64', 65' are connected in such a way that the adder 64 and 64' adds the output of the device 61 and 61' with the output of the cell 62 pr 62' and the adder 65 or 65' respectively add the output of the preceeding adder 64 or 64' with the output of the cell 63 or 63'. An adder 66 adds up the outputs of the adders 65 and 65'. We thus perform the algorithm:

$$DP_{on} = \sum_{y=-2}^{+2} /P_{yn} - P_{y(n-1)}/$$

wherein $P_{on}$, $P_{-2n}$ and $P_{2n}$ correspond to the encoding of the pixels of the memory 12b, belonging to different memory lines but with the same abscissa and $P_{-0(n-1)}$, $P_{-2(n-1)}$ and $P_{2(n-1)}$ correspond to the encoding of the memory 12c pixels with the same spatial position;

P-hd In or $P_{In}$ correspond to the encoding of pixels of the memory 12d, belonging to different memory lines adjacent to the memory lines of the processed memories 12a and 12b, but with the same abscissa and $P_{-1n-1}$), $P_{1(n-1)}$ correspond to the encoding of the memory 12c pixels with the same spatial position.

The output of the adder 66 is sent to the input of a comparator 67 which compares the value A obtained with a threshold value in giving, at output, a "1" if A is greater than B and a "0" if A is smaller than or equal to B. The outputs of the comparator 67 are sent serially into the storage cells 68, 69, 70, 71 so that, at the end of five computations of $DP_{pn}$ a comparison is made in a majority logic circuit so as to send a majority-based piece of information on motion as a function of five pieces of information on motion, for example a piece of information on motion "1" if three of the pieces of information on motion coming from the cells of 68, 69, 70, 71 and from the comparator 67 are encoded by a "1". This information on motion is sent to a one-line delay cell 73, of the same type as the cells 62, 63, 62', 63'. At output of this cell 73, there is sent a piece of information on motion that is used by the frequency conversion device to activate the change-over switch 23.

Figure 9:
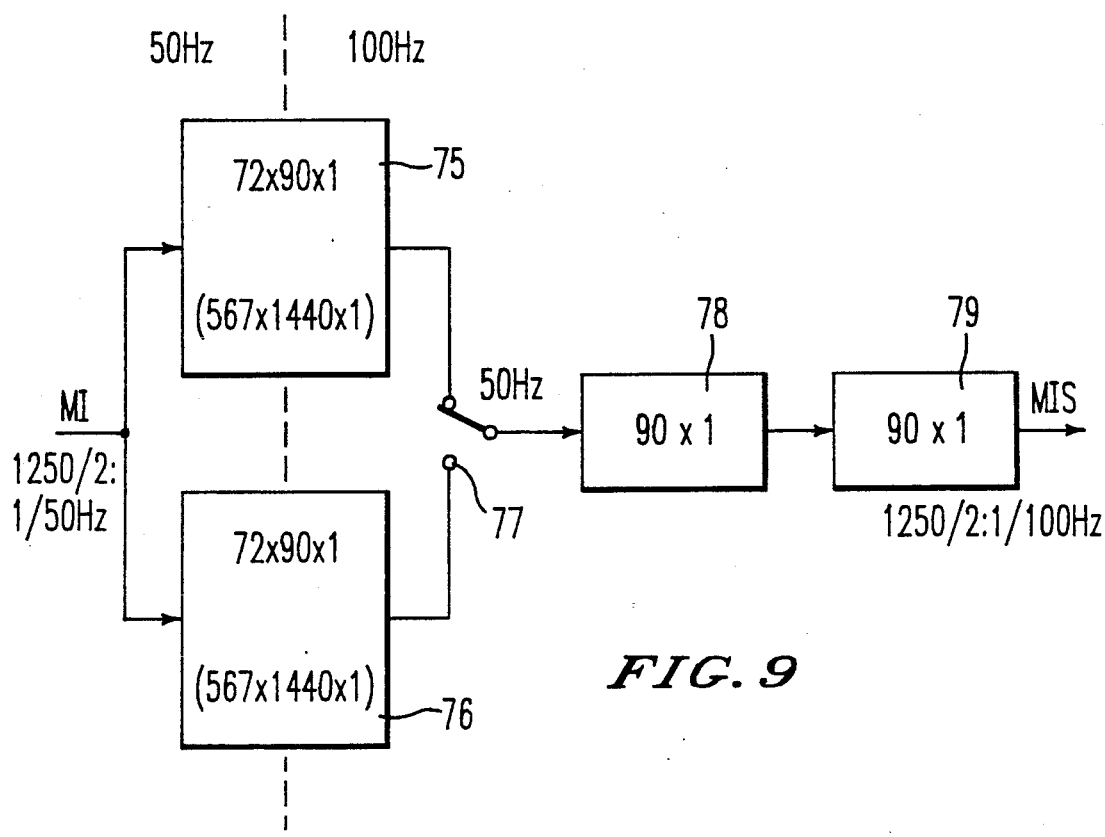
FIG. 9 is a block diagram of a motion information processing device in the case of a conversion from 1250/2:1/50 Hz into 1250/2:1/100 Hz.

Referring to FIG. 9, we shall now describe an embodiment of a device to convert the motion information contained in the video signals of a high-definition television receiver, more particularly in the DATV signal coming from the decoder 2, into a motion information signal at the field rate and with the number of lines desired, capable of being exploited in the rate conversion device 4 in the case of a television receiver of the type described in FIG. 1.

FIG. 9 shows the structure of a simplified device according to the present invention that is used when the video signal at input is a 1250/2:1/50 Hz signal and when the display signal is a high-definition signal of the 1250/2:1/100 Hz. In this case, only a rate conversion and an equalizaton of the transfer time have to be done so as to obtain a motion or non-motion information signal that is synchronous with the video signals to be displayed. In the embodiment shown, we refer to the case where the motion information is encoded on the basis of one bit for a block of several pixels or several adjacent lines. In the present case, there is one bit of information for one bloc of 16 pixels ×16 field lines. This encoding enables the memory size to be diminished. In effect, as shown in FIG. 9, the device according to the present invention has two memories, 75, 76, each having a capacity of 72 lines ×90 words ×1 bit. The memory 75 stores the motion information concerning the odd fields while the memory 76 stores the motion information concerning the even fields. Should there be one piece of motion information for each pixel, the storage capacity of the memories would have to be 567 ×1440 × bits, as shown parenthetically in memories 75 and 76 of FIG. 9. The storage of the pieces of motion information in the memories 75 and 76 is done at the field rate of the input video signal, namely at 50 Hz in the present case. In accordance with the present invention, to obtain the motion or non-motion information signal desired, capable of being used at a field rate of 100 Hz, the memories 75 and 76 are read at the field rate of the output video signal, namely at the rate of 100 Hz. The memories are connected to the input of a multiplexer 77 or switching device which alternately connects the memory 75 and the memory 76 to the input of a processing circuit which, in the present case, is formed by two delay cells 78 and 79, having a capacity of one memory line, namely 90 ×1 bits. The switching over between the two memories is done at the rate of 50 Hz. The use of the two delay cells 78 and 79 makes it possible to obtain a piece of information MIS, at output, that is synchronous with the piece of video information to be processed. The signal MIS thus obtained can be used directly to carry out the switching over between the static type vertical filters and the dynamic type vertical filters used in the rate conversion device above described.

Figure 10:
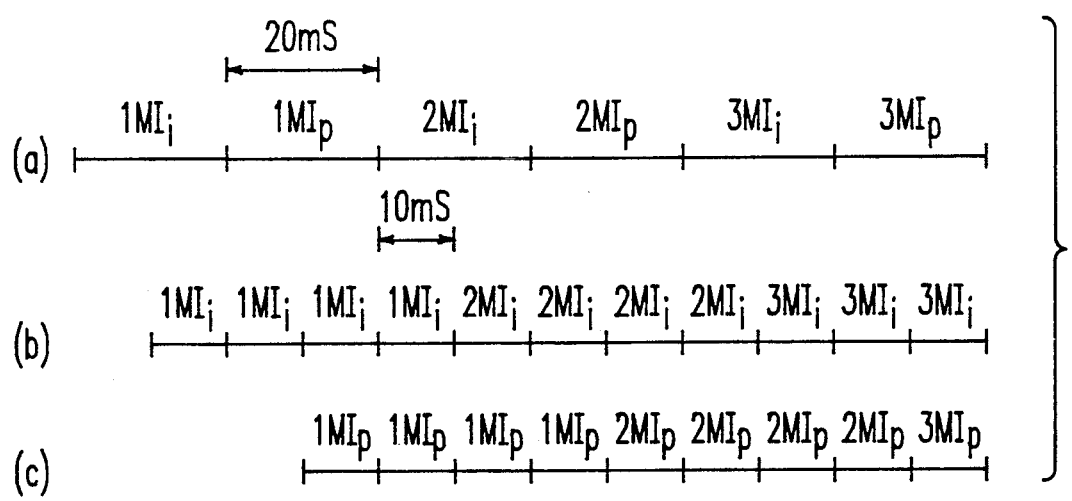
FIG. 10 is a timing diagram explaining the working of the device of FIG. 1.

We shall now explain the working of the device of FIG. 9, referring more particularly to the timing diagram of FIG. 10. The signal (a) corresponds to the input signal at 50 Hz and represents the pieces of information for the successive fields $1MI_i$, $1MI_p$, $2MI_i$, $2MI_p$, $3MI_i$, $3MI_p$, etc., the duration of which is 20 milliseconds. In this case, the pieces of motion information corresponding to the odd fields $1MI_i$, $2MI_i$, $3MI_i$ etc. are stored in the field memory 75. In the same way, the pieces of motion information corresponding to the even fields $1MI_p$, $2MI_p$, $3MI_p$ are stored in the memory 76. The memories 75 and 76 are read at a rate of 100 Hz. Hence, at output of the memory 75, we obtain pieces of data MI such as are shown in the diagram (b) and at output of the memory 11, we obtain the pieces of motion data shown in the diagram (c) of FIG. 10. Thus, at output of the memories 75 and 76, at a rate which is double the initial rate, we obtain respectively the pieces of motion information, $1MI_i$, $1MI_i$, $1MI_i$, $2MI_i$, $2MI_i$, $2MI_i$, $2MI_i$ and the pieces of motion information $1MI_p$, $1MI_p$, $1MI_p$, $1MI_p$, $2MI_p$, $2MI_p$, $2MI_p$, $2MI_p$, each of these pieces of information being held four times. These pieces of information are then multiplexed by the multiplexer 77 so as to obtain a piece of information MIS at the rate of 100 Hz in the present case.

Figure 11:
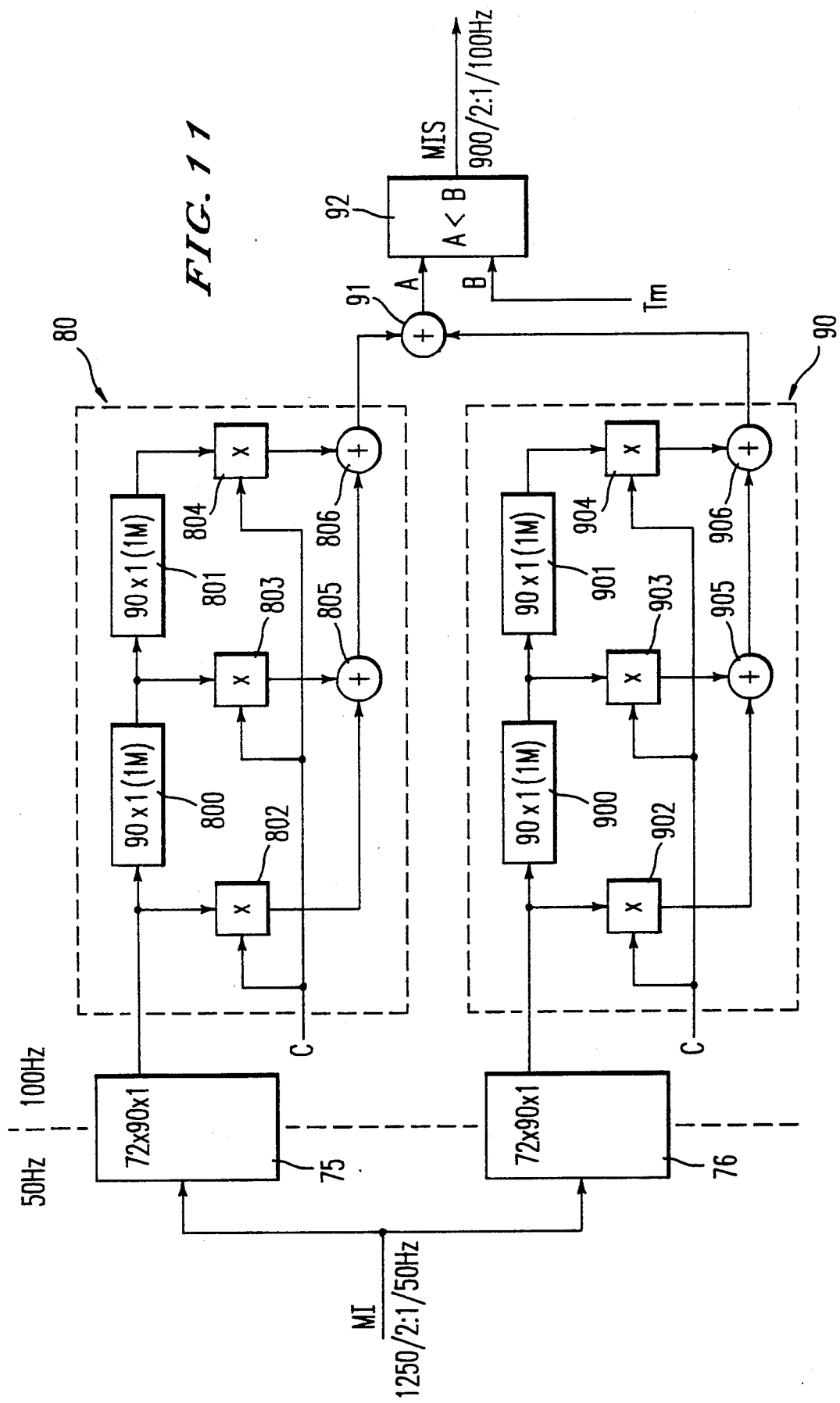
FIG. 11 is a motion information processing device used more particularly in the case of a conversion from 1250/2:1/50 Hz into 900/2:1/100 Hz.

Referring to FIG. 11, we shall now describe a device according to the present invention which may be used notably when the video signal is displayed on 900 lines.

The circuit of FIG. 11 includes the two memories 75 and 76 in which there are stores the pieces of motion information relating to the odd fields and to the even fields respectively. The storage is done at a rate of 50 Hz and the memories are read at a double rate, namely 100 Hz in the embodiment shown. In accordance with the present invention, a filtering circuit 80 or 90 is used at the output of each memory. Each filtering circuit is formed, in the embodiment shown, by two one-line delay cells 800, 801 or 900, 901, three multipliers or adder or shifter cells 802, 803, 804 or 902, 903, 904, and two adders 805, 806 or 905, 906. The delay cells have a capacity of 90 ×1 bits. They each enable the storage of one line of the memory storing the motion information. The multipliers are connected in the following manner. At one of their inputs, they receive a multiplier coefficient specific to each multiplier and sent under the effect of a control signal C. These multiplier coefficients are a function of the sampling of the signal to be displayed. In fact, the multiplier coefficients used in this case will be identical to the multiplier coefficients used for the rate conversion device above described. At their other input, the multipliers either directly receive the output of the correspondence memories 75 or 76 or receive the output of the one-line delay cells 800, 801 or 900, 901. The outputs of the multipliers 802, 803, 804, or 902, 903, 904 are sent to the adders 805, 806 or 905, 906 in such a way that the adder 805 receives the outputs of the multipliers 802 and 803 or 902 and 903 and the adder 806 or 906 receives the output of the adder 805 or 905 and of the multiplier 804 or 904. In fact the vertical filters used here have the same basic structure as the vertical filters used in the rate conversion device above described. The outputs of the two vertical filters 80 and 90 are sent to an adder 91. The output of the adder 91 is sent to a comparator 92 which makes a comparison between the signal containing a piece of motion information thus obtained and a threshold value Tm. Thus, after summation of the contributions of the odd field and even field memories 75 and 76, the output of the filter, namely the output of the adder 91, is compared with the threshold value Tm. It will be noted that, since the piece of data relating to the motion information is encoded in the form of a "1" for the static signals and in the form of a "0" for the dynamic type (i.e. moving) signals, when the output value of the filter is at its highest, the input video signal will be processed like a static signal. At the limit, with pieces of data relating to the motion information indicating a motion on all the lines processed, namely five lines in the present case, the output of the filter will be equal to the sum of all the coefficients of the filter referenced Sm. Consequently, depending on the threshold, the circuit may be biased towards operation in static mode or in dynamic mode. Generally, the threshold value Sm is chosen so that $0<Tm<Sm$.

If the output of the filter is greater than Tm, then the static processing is chosen whereas if the output of the filter is smaller than Tm, then the dynamic processing is chosen. For example, a reasonable threshold value will be a value that achieves the switching over between a static processing operation and a dynamic processing operation should the pieces of data relating to the motion information coming from at least three times in the vertical filter correspond to a video signal in motion.

The above device may be used in the case of a conversion from 1250/2:1/50 Hz into 1250/2:1/100 Hz. Then, the multiplier coefficients applied to the multipliers 802, 803 or 902, 903 will be equal to "0" while the multiplier coefficient applied to the multiplier 804 or 904 will be equal to "1".

Figure 12:
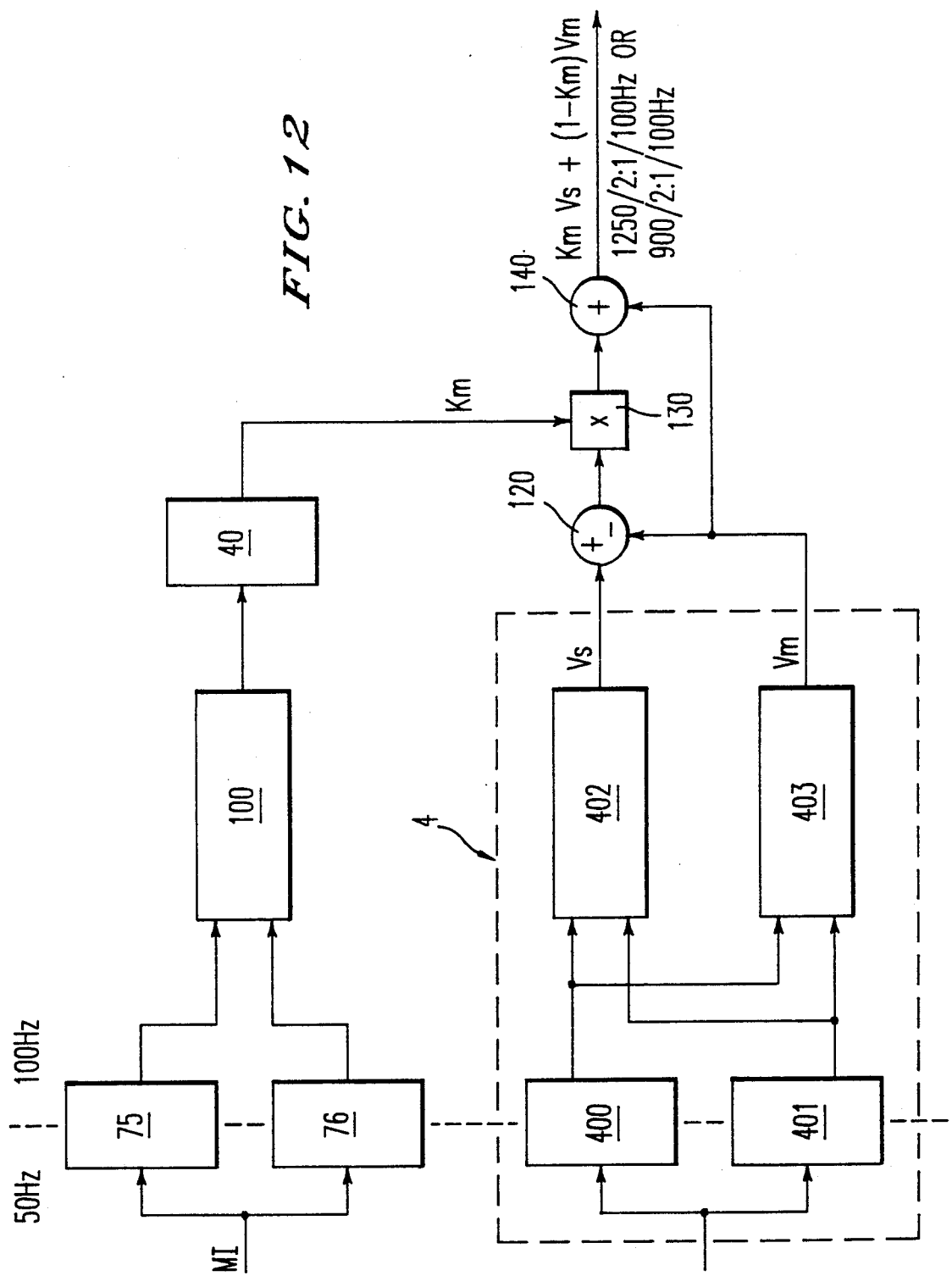
FIG. 12 is a block diagram of a processing device associated with a field rate conversion device using a gradual switching system.

Referring to FIG. 12, we shall now describe the case where the motion information signal is no longer a signal of the all or nothing type but one that enables a gradual switching operation.

FIG. 12 gives a schematic view of the field rate conversion device 4 shown in FIG. 1. This field rate conversion device includes respectively a memory to store the odd fields 400 and a memory to store the even fields 401. It includes a static type signals processing device 402 corresponding to the device 20 of FIG. 5 and receiving, at input, the outputs of the two memories 400 and 401 and giving out a static type of video signal at output. It also includes a dynamic type signals processing device 402 corresponding to the device 21 of FIG. 5 and receiving, at input, the outputs of the two memories 400 and 401 and giving out a dynamic type video signal at output. For a more detailed description of the device 4, reference is made to the description above presented with respect to FIGS. 2-8. Furthermore, FIG. 12 shows a device to convert the motion information contained in the video signals into a motion information signal as described here above. This device therefore includes two memories 75 and 76, respectively storing the motion information pertaining to the even and odd fields, these two memories being connected to the input of a processing circuit 100 which is of the type described with reference to FIG. 11 but does not include the comparator 92. As a consequence, the circuit 75 includes the vertical filters 80 and 90 and the adder 90. The output signal from the adder 91 is sent to a table 110 which gives out a coefficient $K_m$ at output. This coefficient $K_m$ is, for example, a function of the speed of the motion information. As shown in FIG. 12, the outputs of the static type and dynamic type video signals coming from the circuit 4 are sent to a subtractor 120 that performs the substraction $(V_2 - V_m)$. The output of the subtractor is sent to a multiplier 130 which receives the coefficient $K_m$ at its other input. In the same way, the output of the multiplier 130 as well as the dynamic type vide signals $V_m$ are sent to the input of an adder 140 so as to do the equation:

$$K_m V_s + (1 - K_m) V_m$$

The ouputs of the static type and dynamic type vertical filters are thus mixed, and this makes it possible to obtain a more gradual transition at the display between the moving images and the static images.

Here above, we have described various preferred embodiments of a device according to the present invention. However, it is clear to those skilled in the art that different modifications can be made to this embodiment without going beyond the scope of the invention. Thus, the motion information may be encoded on several bits. This encoding would then give, for example, a piece of information on the speed of the motion of the signal. For example, if the pieces of binary value "0" could indicate a fast motion, the binary value "3" could indicate that the signals are static and the binary values "1" and "2" could indicate signals in slower motion. In this case, the above-described devices would have to be modified as regards the storage capacity of the memories, the capacity of the delay cells and the threshold value for example. Furthermore, an additional piece of information could be decoded from the original DATV signal, enabling the selection of one of the different threshold values from among several threshold values.

Besides, the coefficients applied to the multipliers could be modified without changing the entire structure, so as to adapt the device to input and output standards not described here above. Moreover, the devices of the present invention could be used with video signals transmitted or displayed at field rates different from those mentioned in the present description.

What is claimed is:

1. A device to convert the motion information contained in the video signals of a high-definition television receiver into a motion information signal at the field rate and with the number of lines desired, said device comprising:
    at least two memories for the storage, at the field rate of the input video signal, of respectively data pertaining to the information on motion of the even fields and data pertaining to the information on motion of the odd fields, these memories being read at the field rate of the video signal to be displayed, and
    a processing circuit connected to the output of the memories, said circuit delivering, from motion information read at the desired field rate, a motion information signal, at the field rate and with the number of lines desired, that is synchronous with the video signal to be displayed.

2. A device according to claim 1 wherein, in the case of decoded HD-MAC 1250/2:2/100 Hz video signals to be displayed, the processing circuit comprises n delay cells in series giving a delay of one memory-line so as to synchronize the motion information signal with the video information, the first cell being connected to the output of the memories by means of a multiplexer working at the input frame frequency.

3. A device according to claim 1, wherein the data relating to the motion information consist of at least one bit for one pixel.

4. A device according to claim 1, wherein the data relating to the motion information consist of at least one bit for one block of pixels.

5. A device according to claim 3 or 4, wherein the data relating to the motion information are constituted by several bits forming an encoding on the speed of the motion information.

6. A device according to claim 1, wherein the processing circuit comprises two identical vertical filters, respectively connected to the output of the even field and odd field memories, an adder receiving the output of the two filters and a comparator comparing the output of the adder with a threshold value so as to give out a motion or non-motion information signal at the field rate and with the number of lines desired.

7. A device according to claim 1, wherein the processing circuit comprises two identical vertical filters, respectively connected to the output of the even field and odd field memories, an adder receiving the output of the two filters and a means generating a coefficient from the output of the adder, said coefficient being a function of the motion information.

8. A device according to claim 5 or 7, wherein each vertical filter comprises n delay cells giving a delay of one memory-line, n+' multipliers each receiving, at one input, a specific multiplier coefficient as a function of the number of lines to be displayed and receiving, at the other input, either the input of the first cell or the output of the n cells, a first adder adding the output of the first two multiplies, and n adders adding the output of the preceding adder and that of the order n +1 multiplier.

* * * * *